(12) United States Patent
Tsutsumi et al.

(10) Patent No.: US 10,180,184 B2
(45) Date of Patent: Jan. 15, 2019

(54) SHIFT POSITION DETECTING DEVICE FOR VEHICLE AND SHIFT CONTROL DEVICE FOR VEHICLE

(71) Applicant: TOYOTA JIDOSHA KABUSHIKI KAISHA, Toyota-shi, Aichi-ken (JP)

(72) Inventors: Takahiko Tsutsumi, Nisshin (JP); Masato Tateno, Toyota (JP); Koki Ueno, Toyota (JP); Hiroshi Shibata, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/500,722

(22) PCT Filed: Aug. 3, 2015

(86) PCT No.: PCT/IB2015/001300
§ 371 (c)(1),
(2) Date: Jan. 31, 2017

(87) PCT Pub. No.: WO2016/020739
PCT Pub. Date: Feb. 11, 2016

(65) Prior Publication Data
US 2017/0219089 A1 Aug. 3, 2017

(30) Foreign Application Priority Data
Aug. 6, 2014 (JP) .................................. 2014-160837

(51) Int. Cl.
*F16H 59/02* (2006.01)
*G01D 18/00* (2006.01)
(Continued)

(52) U.S. Cl.
CPC ............. *F16H 59/02* (2013.01); *B60K 17/04* (2013.01); *F16H 59/0204* (2013.01);
(Continued)

(58) Field of Classification Search
None
See application file for complete search history.

(56) References Cited

U.S. PATENT DOCUMENTS

| 2008/0278218 A1 | 11/2008 | Fouts et al. |
| 2011/0202231 A1 | 8/2011 | Ueno et al. |
| 2013/0063133 A1 | 3/2013 | Iwata |

FOREIGN PATENT DOCUMENTS

| CN | 102271951 A | 12/2011 |
| CN | 102997943 A | 3/2013 |

(Continued)

*Primary Examiner* — Colby M Hansen
(74) *Attorney, Agent, or Firm* — Oliff PLC (57) ABSTRACT

A detecting device includes a shift selector, a magnet disposed in the shift selector, four or more sensors arranged at positions facing the magnet and an ECU. The ECU is configured to (i) determine a shift position based on signals output from the four or more sensors when the magnet is relatively displaced with respect to the four or more sensors in response to an operation of the shift selector, (ii) determine the shift position based on signals output from three or more of the four or more sensors determined to be normal when any one of the four or more sensors is abnormal, and (iii) determine the abnormality based on whether or not the three or more sensors output, during the traveling of the vehicle, a signal to a shift position pertaining to a case of traveling in the direction opposite to a traveling direction of the vehicle.

6 Claims, 5 Drawing Sheets

(51) Int. Cl.
    *B60K 17/04* (2006.01)
    *G01D 5/20* (2006.01)
    *G01D 5/244* (2006.01)
    *F16H 59/10* (2006.01)
    *G01D 5/12* (2006.01)

(52) U.S. Cl.
    CPC ............ *F16H 59/105* (2013.01); *G01D 5/12* (2013.01); *G01D 5/2033* (2013.01); *G01D 5/24461* (2013.01); *G01D 18/00* (2013.01)

(56) References Cited

FOREIGN PATENT DOCUMENTS

| | | |
|---|---|---|
| EP | 2568260 A2 | 3/2013 |
| JP | 2010-107376 A | 5/2010 |
| JP | 2011-252712 A | 12/2011 |
| JP | 2013-060055 A | 4/2013 |
| JP | 2014-024431 A | 2/2014 |

SHIFT POSITION DETECTING DEVICE FOR VEHICLE AND SHIFT CONTROL DEVICE FOR VEHICLE

BACKGROUND OF THE INVENTION

1. Field of the Invention

The invention relates to a shift position detecting device for a vehicle that detects a shift position of a shift selector and a shift control device for a vehicle that has the shift position detecting device for a vehicle.

2. Description of Related Art

Japanese Patent Application Publication No. 2013-60055 (JP 2013-60055 A) discloses a position sensor that is a shift position detecting device which detects a shift position of a shift selector. In the position sensor disclosed in JP 2013-60055 A, a magnet is arranged to face three Hall elements that are arranged on a straight line and function as sensors and the shift position of the shift selector is detected based on signals (output voltages) output from the respective Hall elements. In addition, according to JP 2013-60055 A, the output difference between the signals (voltage signals) of the respective Hall elements is calculated, the output difference is compared to a reference value set in advance, and any one of the Hall elements is determined to have failed in a case where the differential between the output difference and the reference value exceeds a predetermined tolerance. The number of the Hall elements disposed as the sensors can be four or more. In this case, the shift position can be detected by using the other three or more elements even when any one of the four or more Hall elements fails.

SUMMARY OF THE INVENTION

Herein, a case will be assumed where, for example, an abnormality is detected in one of the four or more sensors due to an electrical fault such as disconnection and a short circuit. In this case, a limp-home mode can be executed based on the signals that are output from the other three or more normal sensors. The abnormality needs to be detected reliably and an additional fail-safe measure such as switching to a neutral gear needs to be executed when an abnormality occurs in any of the other sensors in the limp-home mode. The abnormality can be detected on an ongoing basis when it comes to the electrical fault in the sensors such as the disconnection and the short circuit. In the case of an abnormality causing the signal (output voltage) output from the sensor to be fixed (so-called intermediate fixation), however, it may be difficult to detect the abnormality unless, for example, a shift operation to a specific shift position is executed. The sensor abnormality may also cause the malfunctioning of forward-reverse switching. In this case, a fail-safe mode may be executed. The fail-safe mode, for example, includes switching to the neutral gear that is performed when the failure of one sensor is detected. As a result, the execution of the limp-home mode may become difficult in this case.

The invention provides a shift position detecting device for a vehicle that is configured to have four or more sensors and allows a limp-home mode while avoiding the malfunctioning of forward-reverse switching and a shift control device for a vehicle that has the shift position detecting device for a vehicle.

A first aspect of the invention provides a shift position detecting device for a vehicle, the detecting device includes a shift selector, a magnet integrally disposed in the shift selector, four or more sensors arranged at positions facing the magnet and an electronic control unit. The electronic control unit is configured to: (i) determine a shift position of the shift selector based on signals output from the four or more sensors when the magnet is relatively displaced with respect to the four or more sensors in response to an operation of the shift selector; (ii) determine the shift position based on signals output from three or more of the four or more sensors determined to be normal when any one of the four or more sensors is determined to be abnormal; and (iii) determine the abnormality based on whether or not the three or more sensors output, during the traveling of the vehicle, a signal to a shift position pertaining to a case of traveling in the direction opposite to the traveling direction of the vehicle.

According to the configuration described above, a limp-home mode is allowed by the other three or more sensors even when one of the four or more sensors fails. An abnormality determination is made with regard to the other three or more sensors as well, based on whether or not the three or more sensors output a signal to the shift position for traveling in the direction opposite to the traveling direction of the vehicle during the traveling. Accordingly, the malfunctioning of forward-reverse switching in the limp-home mode by the other three or more sensors is avoided. Accordingly, the limp-home mode by the three or more sensors is allowed while the malfunctioning of the forward-reverse switching is avoided reliably.

In the detecting device described above, the electronic control unit may be configured to determine, when the signals output from the three or more sensors are signals corresponding to the same shift position, that the same shift position is the shift position of the shift selector. According to the configuration described above, the signals output from the other three or more sensors showing the same shift position without exception results in a determination of operation to that shift position even in a case where one of the four or more sensors fails. Accordingly, the limp-home mode based on that shift position is allowed.

In the detecting device described above, the four or more sensors may output voltage signals in accordance with a relative position with respect to the magnet disposed in the shift selector, and the voltage signals output by the four or more sensors may have different voltage values. According to the configuration described above, the four or more sensors output different voltage values in accordance with the relative position with respect to the magnet. Accordingly, the determination of the shift position based on the voltage value output by sensor is allowed.

In the detecting device described above, the four or more sensors may be collinearly arranged. The shift selector may be configured to move in a shift direction and a select direction, the shift direction may be a direction of arrangement of the collinearly-arranged four or more sensors, and the select direction may be perpendicular to the shift direction. A relative relationship of the voltage values output from the four or more sensors may be reversed when the shift selector is operated in the select direction. According to the configuration described above, the relative relationship of the voltage values output from the respective sensors is reversed when the shift selector is operated in the select direction. Accordingly, a select-direction operation of the shift selector can be determined.

In the detecting device described above, the electronic control unit may be configured to determine the abnormality based on whether or not the differential value between the voltage values output from the four or more sensors exceeds a pre-set tolerance. According to the configuration described above, the differential value in voltage value output from the respective sensors is calculated with frequency while it is determined whether or not the differential value exceeds the tolerance. Accordingly, the sensor that has an abnormality can be detected with frequency.

A second aspect of the invention provides a shift control device for a vehicle, the vehicle including a driving device and the shift control device. The control device includes a shift selector, a magnet integrally disposed in the shift selector, four or more sensors arranged at positions facing the magnet and an electronic control unit. The electronic control unit is configured to (i) determine a shift position of the shift selector based on signals output from the four or more sensors when the magnet is relatively displaced with respect to the four or more sensors in response to an operation of the shift selector, (ii) determine the shift position based on signals output from three or more of the four or more sensors determined to be normal when any one of the four or more sensors is determined to be abnormal, (iii) determine the abnormality based on whether or not the three or more sensors output, during the traveling of the vehicle, a signal to a shift position pertaining to a case of traveling in the direction opposite to the traveling direction of the vehicle, and (iv) switch a shift range of the driving device to a neutral gear when the abnormality is determined.

According to the configuration described above, a limp-home mode is allowed by the other three or more sensors even when one of the four or more sensors fails. An abnormality determination is made with regard to the other three or more sensors as well, based on whether or not the three or more sensors output a signal to the shift position for traveling in the direction opposite to the traveling direction of the vehicle during the traveling. Accordingly, the malfunctioning of forward-reverse switching in the limp-home mode by the other three or more sensors is avoided. Accordingly, the limp-home mode by the three or more sensors is allowed while the malfunctioning of the forward-reverse switching is avoided reliably. When an abnormality is determined in any one of the three or more sensors, the shift range of the detecting device is switched to the neutral gear, and thus the malfunctioning of the forward-reverse switching can be avoided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with respect to accompanying drawings. The drawings for the following embodiment are appropriately simplified or modified, and the dimensional ratio, shape, and the like of each section may not be accurately drawn.

Figure 1:
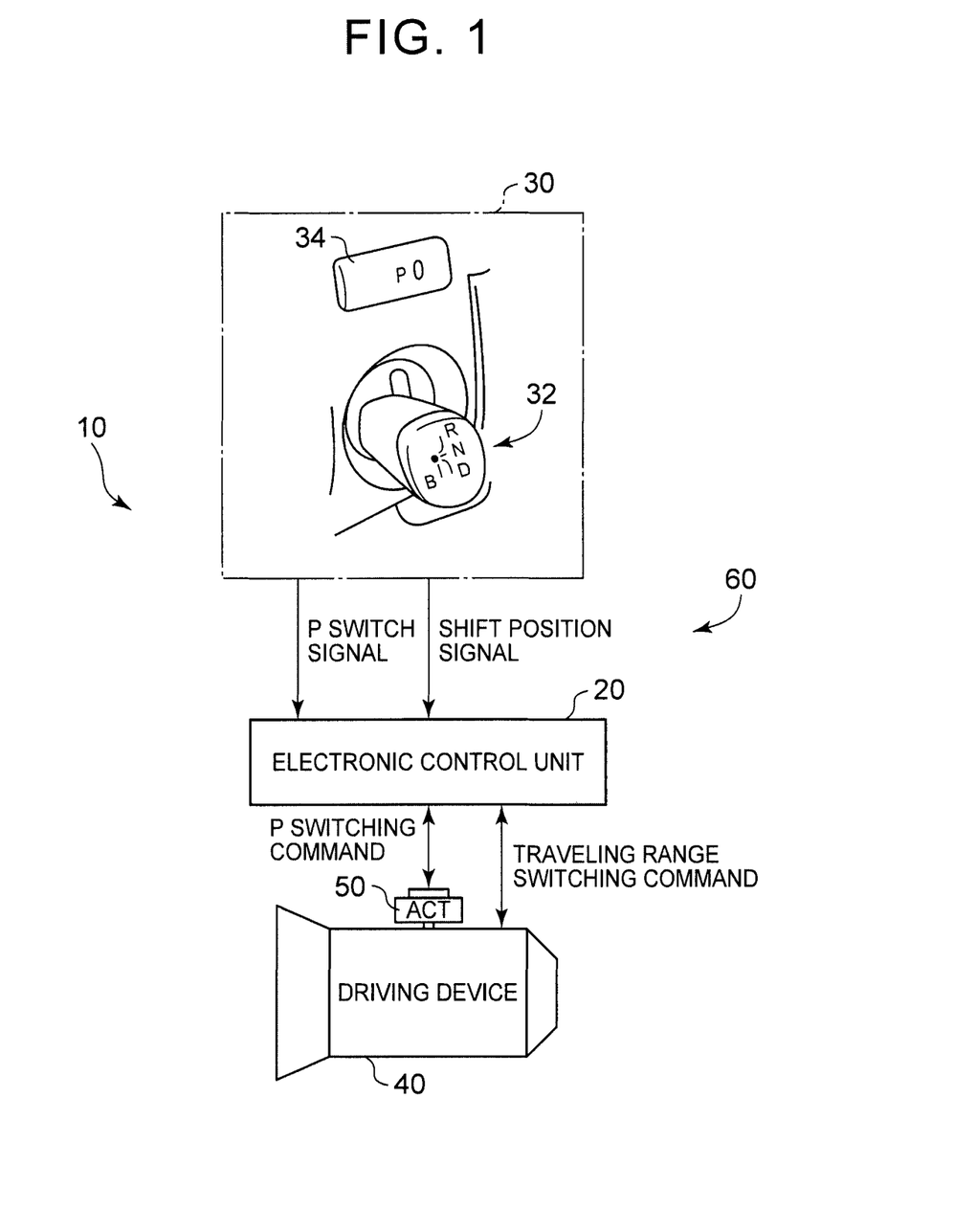
FIG. 1 is a diagram showing a schematic configuration of a shift control device for a vehicle according to an embodiment of the invention.

FIG. 1 is a diagram showing a schematic configuration of a shift control device 10 for a vehicle according to the embodiment of the invention. The shift control device 10 is provided with an electronic control unit 20, a shift operation device 30, a driving device 40, and the like. The shift control device 10 according to this embodiment functions as a shift-by-wire-type shift control device that electrically switches the shift range of the driving device 40. Hereinafter, a case where the shift control device 10 is applied to a hybrid vehicle that is provided with an engine and an electric motor as driving force sources will be described as an example. The shift control device 10, however, can also be applied to other types of vehicles such as engine vehicles and electric vehicles.

The electronic control unit 20 is configured to include a so-called microcomputer that has a CPU, a ROM, a RAM, an I/O interface, and the like. The electronic control unit 20 performs signal processing in accordance with a program stored in advance in the ROM while using the temporary storage function of the RAM. In this manner, driving control such as hybrid driving control related to the engine (not illustrated) and a motor MG provided in the driving device 40, control for switching the shift range of the driving device 40, and the like are executed.

A plurality of signals are supplied to the electronic control unit 20. The plurality of signals include a shift position signal, a P switch signal, a vehicle speed signal, and the like. The shift position signal is a signal from, for example, a position sensor that detects a shift position Psh of a shift lever 32. The P switch signal is a signal that allows the shift range of the driving device 40 to be switched between a parking range (P range) and a non-P range, that is, a shift range other than the parking range, based on a driver's operation.

Examples of signals output from the electronic control unit 20 include a command for engine output control, a motor control command as a command for the operation of the electric motor in the driving device 40, a shift range switching control command for switching the shift range of the driving device 40, and a P switching control command as a command for the operation of a parking lock device 50.

The electronic control unit 20 comprehensively controls the operation of the driving device 40. For example, the electronic control unit 20 controls the traveling of the vehicle by outputting the motor control command related to the traveling of the vehicle to the driving device 40. The electronic control unit 20 electrically controls the switching of the shift range by outputting, to the driving device 40, the shift range switching control command for the vehicle based on the shift position signal from the shift operation device 30. The electronic control unit 20 outputs, to the parking lock device 50, the P switching control command that allows the shift range of the driving device 40 to be switched between the P range and the non-P range based on the P switch signal from a P switch 34.

Figure 2:
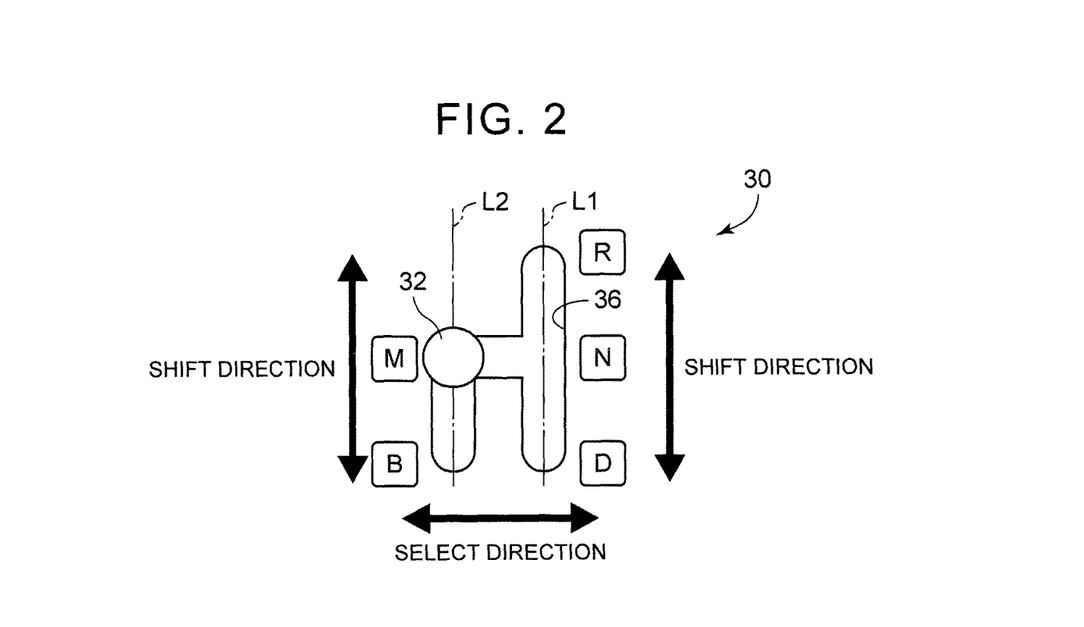
FIG. 2 is a diagram illustrating the overview of a shift operation device that is operated by using the shift lever which is illustrated in FIG. 1.

FIG. 2 illustrates an example of the overview of the shift operation device 30 that is operated by using the shift lever 32 which is illustrated in FIG. 1. In FIG. 2, the illustration of the P switch 34 is omitted. The shift operation device 30 is arranged in, for example, the vicinity of a driver's seat. The shift operation device 30 is provided with the momentary-type shift lever 32 that is operated toward a plurality of the shift positions Psh. The momentary type means the shift lever 32 automatically returning to an original position, which is set in advance, when a movement of the shift lever 32 by the driver is released. The shift lever 32 is one of the example of a shift selector.

In this embodiment, the shift lever 32 is allowed to be moved, along a shift gate 36, in a shift direction and in a select direction as illustrated in FIG. 2, the shift direction being parallel to the forward-rearward direction of the vehicle and the select direction being parallel to the width direction of the vehicle. Regarding the shift-direction operation of the shift lever 32 in the shift operation device 30, an operation along a first straight line L1 and an operation along a second straight line L2, which is parallel to the first straight line, are allowed. The three shift positions Psh of an R position for switching to a reverse traveling range, a neutral position where power transmission is cut off, and a D position for switching to a forward traveling range are set on the first straight line L1. Two operation positions are set on the second straight line L2, one being a neutral position that is a position to which the shift lever 32 automatically returns after the operation of the shift lever 32 and the other one being a B position that allows engine braking to occur. A select-direction operation of the shift lever 32 is allowed between an M position and an N position.

Figure 3:
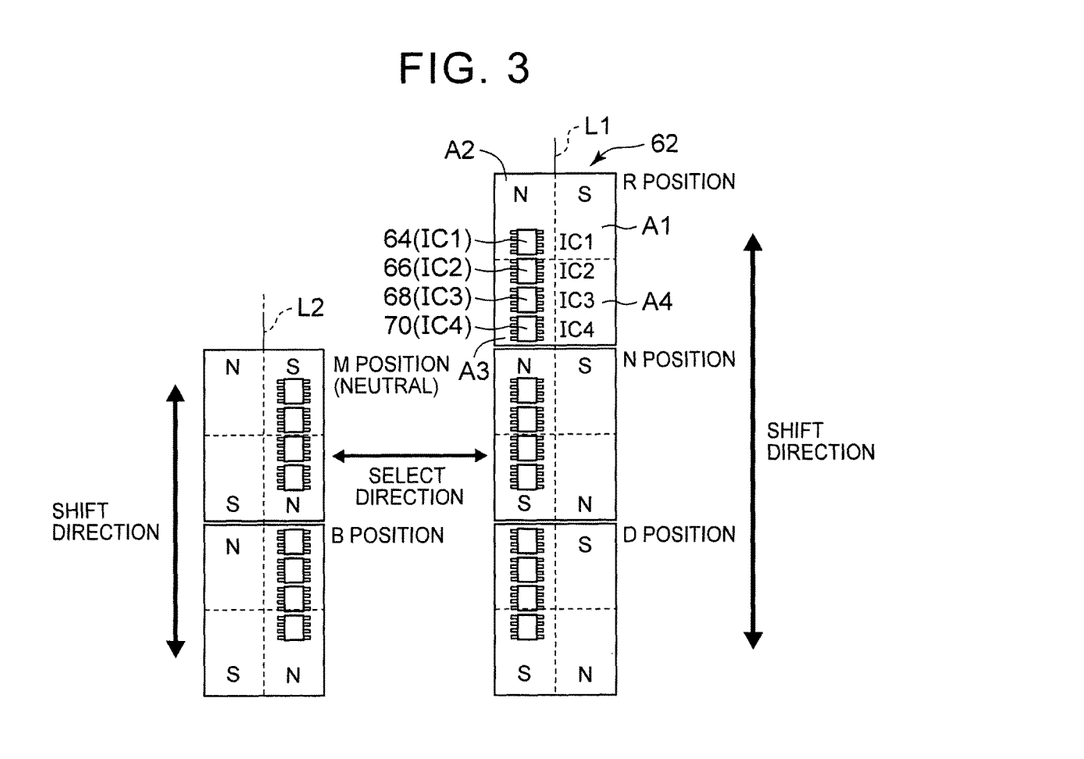
FIG. 3 is a diagram illustrating a basic configuration of a shift position detecting device that detects a shift operation position of the shift lever which is operated by using the shift operation device illustrated in FIG. 2.

FIG. 3 illustrates a basic hardware configuration of a shift position detecting device 60 that detects the shift operation position Psh of the shift lever 32 which is operated by using the shift operation device 30 illustrated in FIG. 2. The shift position detecting device 60 is configured to include a single magnet 62 that is integrally disposed in the shift lever 32 and four Hall ICs, that is, a Hall IC 64 (hereinafter, referred to as an IC1), a Hall IC 66 (hereinafter, referred to as an IC2), a Hall IC 68 (hereinafter, referred to as an IC3), and a Hall IC 70 (hereinafter, referred to as an IC4). The single magnet 62 is integrally moved with the lever 32 in response to the operation of the shift lever 32. The four Hall ICs, that is, the Hall IC 64 (hereinafter, referred to as the IC1), the Hall IC 66 (hereinafter, referred to as the IC2), the Hall IC 68 (hereinafter, referred to as the IC3), and the Hall IC 70 (hereinafter, referred to as the IC4) are immovably arranged on a substrate (not illustrated) while facing a lower surface of the magnet 62. Hereinafter, the Hall IC1, the Hall IC2, the Hall IC3, and the Hall IC4 will be simply referred to as each Hall IC when not particularly distinguished. Each Hall IC is arranged below the magnet 62, and thus each Hall IC is out of sight from the view of FIG. 3 in reality. For convenience, however, each Hall IC is shown in FIG. 3 so that the relative position of each Hall IC with respect to the magnet 62 can be seen. The magnet 62, the Hall IC 64, the Hall IC 66, the Hall IC 68, the Hall IC 70, and the electronic control unit 20 (a shift position determination unit 80 and a second abnormality determination unit 86) according to this embodiment are examples of the shift position detecting device.

FIG. 3 illustrates the relative positions of the magnet 62 and each Hall IC available when the shift lever 32 is operated to each of the shift positions Psh corresponding to those in FIG. 2. In FIG. 3, the magnet 62 and each Hall IC are drawn by shift position Psh. In reality, however, the shift operation device 30 is configured to have the single magnet 62 and the four Hall ICs and the magnet 62 is relatively displaced with respect to the four Hall ICs in response to the operation of the shift lever 32. The Hall IC 64, the Hall IC 66, the Hall IC 68, and the Hall IC 70 correspond to the four or more sensors according to the invention.

As illustrated in FIG. 3, the Hall ICs are collinearly arranged at regular intervals in the shift direction. The shift lever 32 is configured to move in the shift direction and in the select direction, the shift direction being the direction in which the shift lever 32 is operated in the direction of the Hall IC arrangement and the select direction being perpendicular to the shift direction. The magnet 62, which is integrally disposed in the shift lever 32, has a rectangular shape and is magnetized for N and S poles to be adjacent to each other upward, downward, leftward, and rightward. In this manner, the magnet 62 has a magnetic pole divided into four imaginary regions as illustrated by the dashed line. Specifically, the upper left and lower right sides of the magnet 62 are the N poles and the upper right and lower left sides of the magnet 62 are the S poles assuming that the first straight line L1 side in the select direction is the right side, the second straight line L2 side in the select direction is the left side, the R position side in the shift direction is the upper side, and the B position and D position side in the shift direction is the lower side. In the following description, the upper right side region of the magnet 62 is defined as a region A1 (S pole), the upper left side region of the magnet 62 is defined as a region A2 (N pole), the lower left side region of the magnet 62 is defined as a region A3 (S pole), and the lower right side region of the magnet 62 is defined as a region A4 (N pole).

When the shift lever 32 is operated to each shift position Psh along the shift gate 36, the relative positional relationship between the magnet 62 and each Hall IC reaches the state that is illustrated in FIG. 3. In a case where the shift lever 32 is at the M position (neutral), for example, the region A1 of the magnet 62 faces the IC1 and the IC2 and the region A4 of the magnet 62 faces the IC3 and the IC4. When the shift lever 32 is shift-operated from the M position to the B position, the magnet 62 is relatively moved with respect to each Hall IC to the lower side in FIG. 3. As a result, the region A1 of the magnet 62 faces the IC1 to the IC3 and the region A4 of the magnet 62 faces the IC4. When the shift lever 32 is shift-operated and select-operated from the M position toward the R position, the magnet 62 is relatively moved with respect to each Hall IC to the upper right side in FIG. 3. As a result, the region A2 of the magnet 62 faces the IC1 and the region A3 of the magnet 62 faces the IC2 to the IC4. When the shift lever 32 is select-operated from the M position toward the N position, the magnet 62 is relatively moved with respect to each Hall IC to the right side in FIG. 3. As a result, the region A2 of the magnet 62 faces the IC1 and the IC2 and the region A3 of the magnet 62 faces the IC3 and the IC4. When the shift lever 32 is shift-operated and select-operated from the M position toward the D position, the magnet 62 is relatively moved with respect to each Hall IC to the lower right side in FIG. 3. As a result, the region A2 of the magnet 62 faces the IC1 to the IC3 and the region A3 of the magnet 62 faces the IC4.

Figure 4:
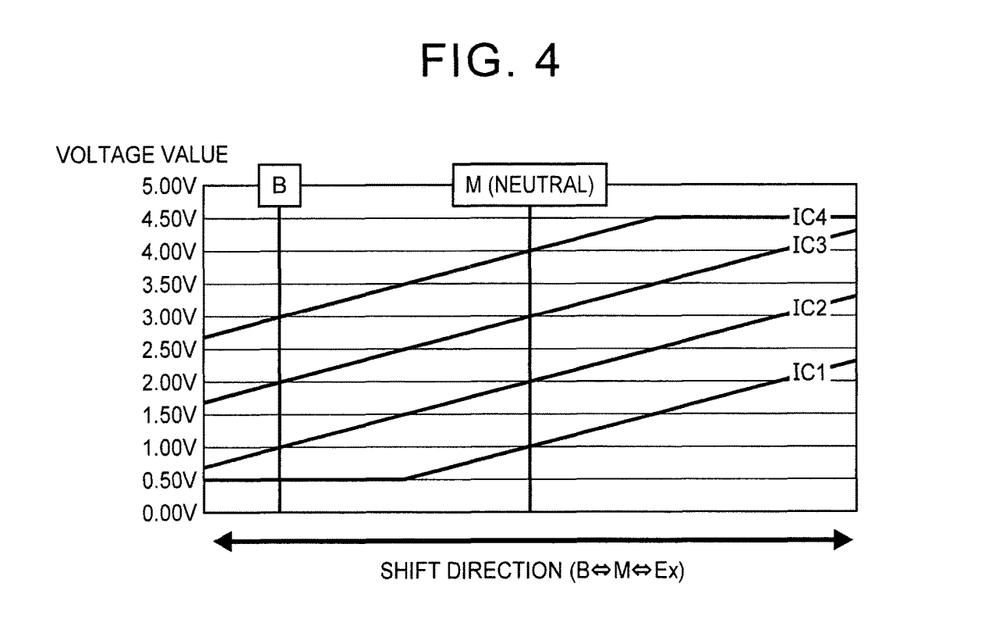
FIG. 4 is a diagram illustrating a voltage value that is output from each Hall IC when the shift lever is shift-operated between the B position and the M position in FIG. 3.

FIG. 4 illustrates a voltage value that is output from each Hall IC when the shift lever 32 is shift-operated between the B position and the M position in FIG. 3. The horizontal axis in FIG. 4 represents the position of the shift lever 32 that is available when the shift lever 32 is moved in the shift direction on the second straight line L2. The vertical axis in FIG. 4 represents the voltage value output from each Hall IC at the position.

As illustrated in FIG. 4, the voltage value that is output from each Hall IC is proportional to the positive side as the shift lever 32 is moved from the B position to the M position side along the second straight line L2. No matter which position on the second straight line L2 the shift lever 32 is at, the voltage value output from the IC1 is exceeded by the voltage value output from the IC2, the voltage value output from the IC2 is exceeded by the voltage value output from the IC3, and the voltage value output from the IC3 is exceeded by the voltage value output from the IC4 (IC1<IC2<IC3<IC4). In this manner, each Hall IC outputs a signal voltage (voltage) corresponding to the relative position (relative distance) with respect to the magnet 62 and outputs a different voltage value for each position of the shift lever 32.

As illustrated in FIG. 4, a voltage of approximately 1.00 V is output from the IC1, a voltage of approximately 2.00 V is output from the IC2, a voltage of approximately 3.00 V is output from the IC3, and a voltage of approximately 4.00 V is output from the IC4 when the shift lever 32 is at the M position (intermediate position). A voltage of approximately 0.5 V is output from the IC1, a voltage of approximately 1.00 V is output from the IC2, a voltage of approximately 2.00 V is output from the IC3, and a voltage of approximately 3.00 V is output from the IC4 when the shift lever 32 is at the B position.

Figure 5:
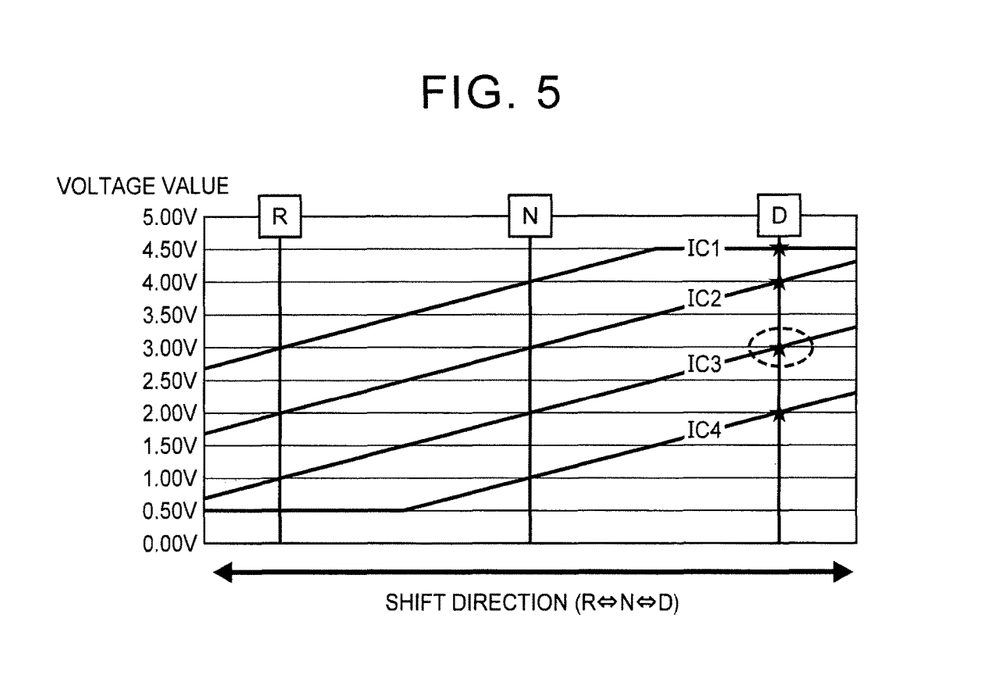
FIG. 5 is a diagram illustrating a voltage value that is output from each Hall IC when the shift lever is shift-operated between the R position and the D position in FIG. 3.

FIG. 5 illustrates a voltage value that is output from each Hall IC when the shift lever 32 is shift-operated between the R position and the D position in FIG. 3. As illustrated in FIG. 5, the voltage value that is output from each Hall IC is proportional to the positive side as the shift lever 32 is moved from the R position to the D position side along the first straight line L1. No matter which position on the first straight line L1 the shift lever 32 is at, the voltage value output from the IC4 is exceeded by the voltage value output from the IC3, the voltage value output from the IC3 is exceeded by the voltage value output from the IC2, and the voltage value output from the IC2 is exceeded by the voltage value output from the IC1 (IC4<IC3<IC2<IC1). In this manner, each Hall IC outputs a different voltage value.

As illustrated in FIG. 5, a voltage of approximately 0.5 V is output from the IC4, a voltage of approximately 1.00 V is output from the IC3, a voltage of approximately 2.00 V is output from the IC2, and a voltage of approximately 3.00 V is output from the IC1 when the shift lever 32 is at the R position. A voltage of approximately 1.00 V is output from the IC4, a voltage of approximately 1.00 V is output from the IC3, a voltage of approximately 2.00 V is output from the IC2, and a voltage of approximately 3.00 V is output from the IC1 when the shift lever 32 is at the N position. A voltage of approximately 2.00 V is output from the IC4, a voltage of approximately 3.00 V is output from the IC3, a voltage of approximately 4.00 V is output from the IC2, and a voltage of approximately 4.50 V is output from the IC1 when the shift lever 32 is at the D position.

Herein, the reversal between the relative relationship of the voltage values output from the respective Hall ICs during the movement of the shift lever 32 on the first straight line L1 (magnitude relationship: IC4<IC3<IC2<IC1) and the relative relationship of the voltage values output from the respective Hall ICs during the movement of the shift lever 32 on the second straight line L2 (magnitude relationship: IC1<IC2<IC3<IC4) occurs because the polarity facing each Hall IC is reversed when the shift lever 32 is select-operated.

Figure 6:
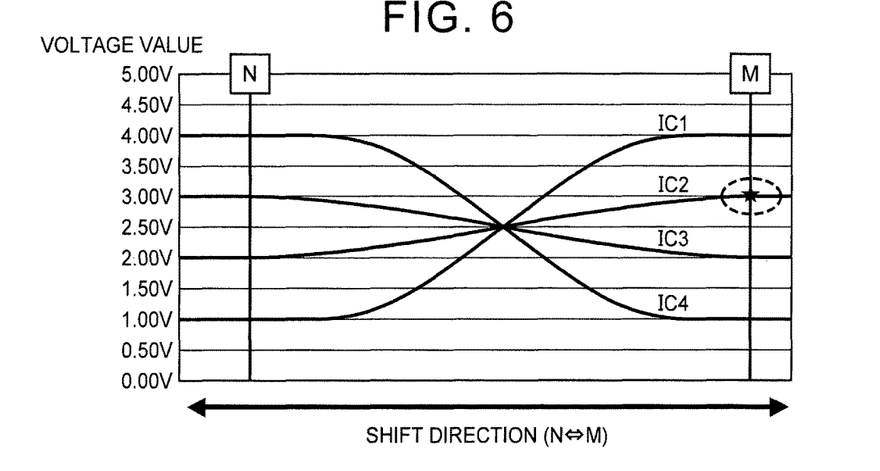
FIG. 6 is a diagram illustrating a voltage value that is output from each Hall IC when the shift lever is moved in a select direction between the M position and the N position in FIG. 3.

FIG. 6 illustrates a voltage value that is output from each Hall IC when the shift lever 32 is moved in the select direction between the M position and the N position. As can be seen in FIG. 3, the polarity of the magnet 62 facing each Hall IC is reversed when the shift lever 32 is operated in the select direction. This reversal in polarity causes the relative relationship (magnitude relationship) of the voltage values of the respective Hall ICs to be reversed.

Figure 7:
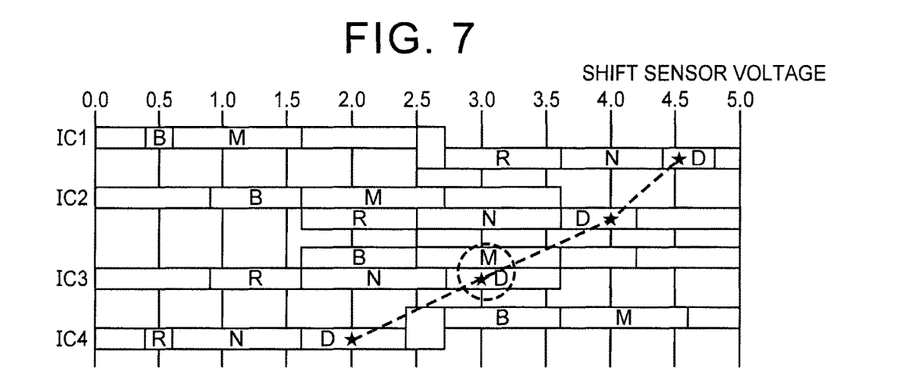
FIG. 7 is a relationship map summarizing the relationship between the shift position and the voltage value illustrated in FIGS. 4 to 6.

FIG. 7 is a map showing the correspondence relationship between the voltage value (shift sensor voltage) output from each Hall IC and the shift position Psh, which corresponds to the relationship between the shift position Psh and the voltage value illustrated in FIGS. 4 to 6. The map in FIG. 7 is obtained in advance and is stored in the electronic control unit. The shift position Psh of the shift lever 32 is determined from this map based on the voltage value actually output from the Hall IC. The width of the voltage value at each of the shift positions Psh is present because the variation in the voltage value output from each Hall IC is taken into account.

For example, it is determined that the shift lever 32 is at the B position when a voltage of approximately 0.4 V to 0.6 V is output from the IC1. It is determined that the shift lever 32 is at the M position when a voltage of approximately 0.6 V to 1.6 V is output from the IC1. It is determined that the shift lever 32 is at the R position when a voltage of approximately 2.7 V to 3.6 V is output from the IC1. It is determined that the shift lever 32 is at the N position when a voltage of approximately 3.6 V to 4.4 V is output from the IC1. It is determined that the shift lever 32 is at the D position when a voltage of approximately 4.4 V to 4.8 V is output from the IC1.

It is determined that the shift lever 32 is at the B position when a voltage of approximately 0.9 V to 1.6 V is output from the IC2. It is determined that the shift lever 32 is at the M position when a voltage of approximately 1.6 V to 2.7 V is output from the IC2. It is determined that the shift lever 32 is at the R position when a voltage of approximately 1.6 V to 2.5 V is output from the IC2. It is determined that the shift lever 32 is at the N position when a voltage of approximately 2.5 to 3.6 V is output from the IC2. It is determined that the shift lever 32 is at the D position when a voltage of approximately 3.6 V to 4.2 V is output from the IC2.

It is determined that the shift lever 32 is at the R position when a voltage of approximately 0.9 V to 1.6 V is output from the IC3. It is determined that the shift lever 32 is at the B position when a voltage of approximately 1.6 V to 2.5 V is output from the IC3. It is determined that the shift lever 32 is at the N position when a voltage of approximately 1.6 V to 2.7 V is output from the IC3. It is determined that the shift lever 32 is at the M position when a voltage of approximately 2.5 to 3.6 V is output from the IC3. It is determined that the shift lever 32 is at the D position when a voltage of approximately 2.7 V to 3.6 V is output from the IC3.

It is determined that the shift lever 32 is at the R position when a voltage of approximately 0.4 V to 0.6 V is output from the IC4. It is determined that the shift lever 32 is at the N position when a voltage of approximately 0.6 V to 1.6 V is output from the IC4. It is determined that the shift lever 32 is at the D position when a voltage of approximately 1.6 V to 2.4 V is output from the IC4. It is determined that the shift lever 32 is at the B position when a voltage of approximately 2.7 V to 3.6 V is output from the IC4. It is determined that the shift lever 32 is at the M position when a voltage of approximately 3.6 V to 4.6 V is output from the IC4.

When the shift positions Psh determined based on the voltages output from the respective Hall ICs are identical to each other, it is determined that the shift lever 32 is operated to that shift position Psh. For the IC2 and the IC3, a region is present to which two shift positions Psh correspond even at the same voltage value. In a case where the voltage value of the IC3 is 3.0 V, for example, any one of the M position and the D position corresponds to the shift position Psh and the shift position Psh is not determined in the IC3. In this case, the determination is made based on the shift position Psh that is determined based on the other Hall ICs (the IC1, the IC2, and the IC4). In a case where any one of the M position and the D position corresponds to the shift position Psh based on the IC3, for example, the determination result is the D position on the condition that the determination results of the other Hall ICs (the IC1, the IC2, and the IC4) are the D position without exception.

In the shift control device 10 according to this embodiment, a limp-home mode is executed based on the shift position Psh determined based on the other three Hall ICs even in a case where any one of the Hall ICs fails (hereinafter, referred to as a single failure). Specifically, in a case where one of the four Hall ICs fails and the shift positions Psh determined by the other three normal Hall ICs are identical to each other, the shift position Psh is the determination result. However, it is also possible that any one of the three Hall ICs fails (hereinafter, referred to as a double failure). In this case, the reliability of the shift position detecting device may be reduced. Accordingly, in a case where the failure of two of the four Hall ICs is detected, an additional fail-safe measure such as switching to a neutral gear needs to be executed. In the case of disconnection or a short circuit, the voltage value that is output from the Hall IC reaches 0 V or at least 5 V. Accordingly, the Hall IC that fails can be promptly identified. In some cases, a deviation abnormality occurs in the form of, for example, a so-called intermediate fixation in which the voltage value is fixed to a voltage value range for the determination of the shift position Psh (0.4 V to 4.8 V in this embodiment). In the case of such a failure, the Hall IC failure may not be detected unless an identification operation is executed and forward-reverse switching may be subject to malfunctioning due to the Hall IC failure. Accordingly, it may be desirable to execute a fail-safe measure making the limp-home mode difficult, such as the switching to the neutral gear, at the point in time when the single failure occurs and it may be difficult to execute the limp-home mode after the occurrence of the single failure. In this embodiment, the control described below is executed so that the malfunctioning of the forward-reverse switching during the occurrence of the double failure is prevented and the limp-home mode following the occurrence of the single failure is allowed.

Figure 8:
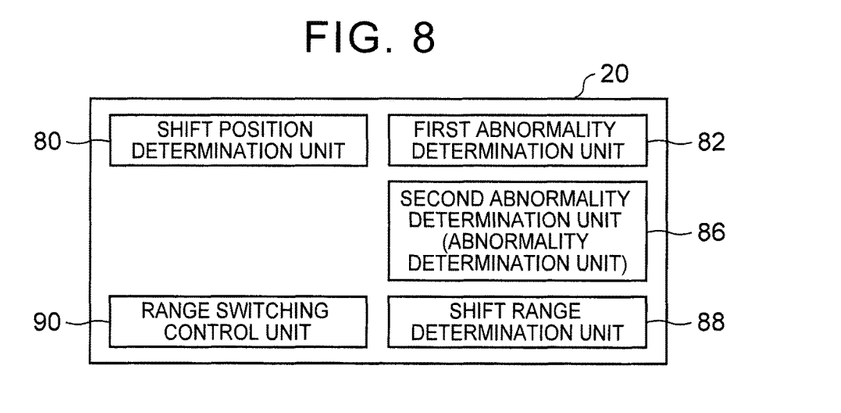
FIG. 8 is a functional block showing a main part of a control operation of the electronic control unit that is illustrated in FIG. 1.

FIG. 8 is a functional block showing a main part of a control operation of the electronic control unit 20 that is illustrated in FIG. 1. The shift position determination unit 80 that is illustrated in FIG. 8 determines the operation of the shift lever 32 to a predetermined shift position Psh based on the voltage value of the voltage (voltage signal) output from each Hall IC (IC1 to IC4). The shift position determination unit 80 detects the voltage value output from each Hall IC on an ongoing basis. The shift position determination unit 80 determines the shift position Psh based on the voltage value of each Hall IC, based on the map in FIG. 7, from the detected voltage value. In a case where at least three of the shift positions Psh determined based on the four respective Hall ICs are identical to each other, the shift position determination unit 80 determines that the shift lever 32 is at that shift position Psh.

For IC2 and the IC3, two of the shift positions Psh may correspond within a predetermined voltage value range. In this case, the shift position determination unit 80 determines the shift position Psh by comparing the shift positions Psh based on the other three Hall ICs. In a case where the voltage value output from the IC3 is 2.7 V to 3.6 V, for example, the shift position Psh is any one of the M position and the D position for the IC3. When the shift position Psh is determined to be the D position without exception for the other Hall ICs (IC1, IC2, IC4) in this case, the D position, which is the most selected shift position Psh, is determined to be the shift position Psh. In other words, the two shift positions Psh of the M position and the D position are determined for the IC3 and the D position is determined for each of the other three Hall ICs, and thus four of the five shift positions Psh become the D position and the most selected D position (selected at least three times) is determined.

A first abnormality determination unit 82 determines the failure of any one of the Hall ICs. In a case where the voltage value output from a predetermined Hall IC deviates from a voltage value range for the detection of the shift position Psh to reach 0 V or exceed 5 V due to disconnection or a short circuit, for example, it is determined that the Hall IC in question has failed (single failure determination).

The first abnormality determination unit 82 calculates the differential values (deviations) between the voltages (voltage signals) of the respective Hall ICs on an ongoing basis. The first abnormality determination unit 82 determines the failure of the Hall ICs based on whether or not the calculated differential value exceeds a pre-set tolerance (deviation abnormality). In a case where the differential values between the respective voltage values of a predetermined Hall IC and the other Hall ICs exceed the pre-set tolerance without exception and the differential value in voltage value related to each of the other Hall ICs is within the tolerance range without exception, for example, it is determined that the deviation abnormality has occurred such as the intermediate fixation in which the voltage value is fixed in the predetermined Hall IC. In other words, the first abnormality determination unit 82 identifies an abnormal Hall IC based on the differential value in voltage value by Hall IC (single failure determination). The first abnormality determination unit 82 does not determine the single failure in a case where the abnormal Hall IC is not determined from the differential values between the voltage values of the respective Hall ICs, examples of which include a determination that any one of the IC2 and the IC3 has failed.

Even when the first abnormality determination unit 82 determines that any one of the four Hall ICs has failed, the shift position determination unit 80 determines the shift position Psh based on the other three Hall ICs. The limp-home mode of the vehicle continues to be executed based on the determined shift position Psh. In this case, the second abnormality determination unit 86 further executes abnormality determination on the other three Hall ICs.

The shift position determination unit 80 determines whether or not each of the shift positions Psh based on the voltage values of the three Hall ICs is identical to one another. In a case where each of the shift positions Psh based on the voltage values (voltage signals) of the three Hall ICs is identical to one another, the result of determination by the shift position determination unit 80 is the shift position Psh determined based on the three Hall ICs. A range switching control unit 90 outputs, to the driving device 40, a command for switching to the shift range corresponding to the shift position Psh determined by the shift position determination unit 80. In this manner, the driving device 40 is switched to that shift range and the limp-home mode is executed. As described above, two shift positions Psh are present, depending on the voltage value, for the IC2 and the IC3 and the determination of a single shift position Psh is not made in some cases. Even in the event of the determination of one of the two above-described shift positions Psh for the other two Hall ICs in this case, which is identical to each other, the determination of that shift position Psh is not made.

In a case where the shift positions Psh based on the voltage values of the three Hall ICs are not identical to each other, a shift range determination unit 88 is put into operation. The shift range determination unit 88 determines whether or not the current shift range of the driving device 40 is any one of the forward traveling range (D range, B range) or the reverse traveling range (R range). This shift range corresponds to the actual shift range of the driving device 40.

The second abnormality determination unit 86 is put into operation in a case where the shift range during the current traveling is any one of the forward traveling range and the reverse traveling range. The second abnormality determination unit 86 determines, with regard to two of the three Hall ICs, whether or not a state where a shift position Psh for traveling in the direction opposite to the direction of movement (traveling direction) with respect to the current shift range is selected has continued for at least a predetermined period of time Ta. The predetermined period of time Ta is a value set in advance. Specifically, the predetermined period of time Ta is set to a value allowing the determination of an operation to a predetermined shift position Psh (for example, approximately 100 msec).

In a case where the current shift range is the forward traveling range (D range, B range) and a state where a voltage value corresponding to the R position is output has continued for at least the predetermined period of time Ta with regard to two of the three Hall ICs, for example, the second abnormality determination unit 86 determines that the state where the shift position Psh corresponding to the traveling in the direction opposite to the direction of movement with respect to the current shift range is selected has continued for at least the predetermined period of time Ta. Likewise, the second abnormality determination unit 86 determines that the state where the shift position Psh corresponding to the traveling in the direction opposite to the direction of movement with respect to the current shift range is selected has continued for at least the predetermined period of time Ta in a case where the current shift range is the reverse traveling range (R range) or in a case where a state where a voltage value corresponding to the shift position Psh (D position, B position) for switching to the forward traveling range (D range, B range) is output has continued for at least the predetermined period of time Ta with regard to two of the three Hall ICs.

When it is determined by the second abnormality determination unit 86 that the state where the shift position Psh corresponding to the shift range for the traveling in the direction opposite to the direction of movement (traveling direction) is selected has continued for at least the predetermined period of time Ta with regard to the two Hall ICs, it is determined that one more of the three Hall ICs has failed (double failure occurrence). When the abnormality (failure) is determined by the second abnormality determination unit 86, the range switching control unit 90 outputs, to the driving device 40, a command for switching the shift range of the driving device 40 to the neutral gear (power transmission cut-off) as a fail-safe measure. In this manner, the shift range of the driving device 40 is switched to the neutral gear, and thus the malfunctioning of the forward-reverse switching is prevented.

As described above, one more Hall IC is determined to have failed (double failure) and the fail-safe measure (neutral gear switching) is executed in a case where the state where the shift position Psh corresponding to the shift range for the traveling in the opposite direction with respect to the current shift range is selected has continued for at least the predetermined period of time Ta with regard to the two of the three Hall ICs. Accordingly, the determination of the switching to the shift position Psh corresponding to the shift range in the opposite direction with regard to the two Hall ICs results in the execution of the fail-safe measure and the switching of the driving device 40 to the neutral gear even in a case where the deviation abnormality (intermediate fixation) occurs in one more Hall IC in the limp-home mode following the failure of one of the four Hall ICs. Accordingly, the malfunctioning of the forward-reverse switching can be prevented. Accordingly, the limp-home mode can be safely executed since the malfunctioning of the forward-reverse switching is prevented reliably during the traveling even in a case where one of the four Hall ICs fails and the traveling continues based on the shift position Psh determined by the other three Hall ICs.

Figure 9:
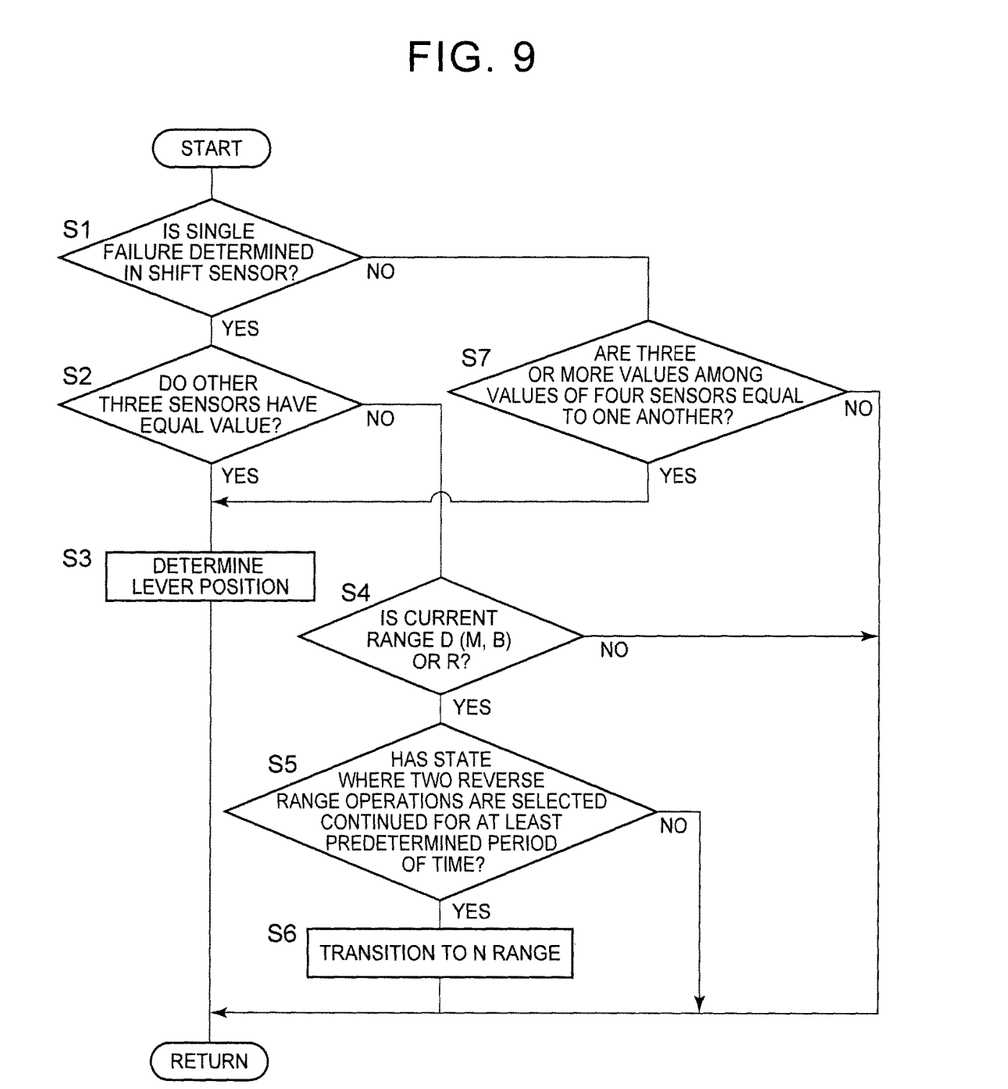
FIG. 9 is a flowchart showing a main part of the control operation of the electronic control unit that is illustrated in FIG. 8, that is, the control operation that allows a limp-home mode even in a case where one Hall IC fails.

FIG. 9 is a flowchart showing control by the electronic control unit 20 that allows the limp-home mode even in a case where one of the four Hall ICs fails. This flowchart is repeatedly executed at an extremely short cycle time of, for example, approximately several msec to tens of msec.

Firstly, it is determined whether or not any one of the four Hall ICs (shift sensors) has failed in Step S1 (hereinafter, Step will be omitted) corresponding to the first abnormality determination unit 82. In a case where the voltage value of a predetermined Hall IC is 0 V or exceeds 5.0 V, for example, it is determined that disconnection or a short circuit has occurred in that Hall IC. Alternatively, in a case where the differential values between the respective voltage values of a predetermined Hall IC and the other three Hall ICs exceed the tolerance without exception and the differential value in voltage value related to each of the other three Hall ICs is within the tolerance range without exception, it is determined that the predetermined Hall IC has failed. The processing proceeds to S7 in the case of a negative determination in S1.

In S7, which corresponds to the shift position determination unit 80, it is determined whether or not the shift positions Psh determined with regard to at least three of the four Hall ICs are identical to one another. In a case where the shift positions Psh determined with regard to the three or more Hall ICs are identical to one another, a positive determination is made herein and the processing proceeds to S3. In S3, which corresponds to the shift position determination unit 80, the shift position is determined to be the shift position Psh determined in S7. This routine is terminated in the case of a negative determination in S7.

In the case of a positive determination in S1, it is determined whether or not the shift positions Psh determined by the other three Hall ICs are identical to one another without exception in S2, which corresponds to the first abnormality determination unit 82. In a case where the shift positions Psh determined by the other three Hall ICs are identical to one another without exception, a positive determination is made in S2 and the shift position Psh determined by the other three Hall ICs is determined in S3.

S4, which corresponds to the shift range determination unit 88, is executed in the case of a negative determination in S2, that is, in a case where the shift positions Psh determined by the other three Hall ICs are not identical. In S4, it is determined whether or not the current shift range is any one of the forward traveling range (D range, B range) and the reverse traveling range (R range). A negative determination is made in S4 and this routine is terminated in a case where the current shift range does not correspond to any one of the forward traveling range and the reverse traveling range, examples of which include the current shift range being the N range.

In the case of a positive determination in S4, that is, in a case where the shift range is any one of the forward traveling and reverse traveling ranges at the current time point, it is determined in S5, which corresponds to the second abnormality determination unit 86, whether or not the state of operation to the shift position Psh corresponding to the shift range in the direction opposite to the current shift range has continued for at least the predetermined period of time Ta with regard to any two of the three Hall ICs. A positive determination is made in S5 and the processing proceeds to S6 when it is determined that the state of operation to the shift position Psh corresponding to the shift range in the direction opposite to the current shift range has continued for at least the predetermined period of time Ta with regard to the two Hall ICs. In S6, which corresponds to the range switching control unit 90, the driving device 40 is switched to the neutral gear and the power transmission is cut off. This routine is terminated in the case of a negative determination in S5.

In this manner, the limp-home mode is executed by the other three Hall ICs even in a case where one Hall IC fails. In some cases, an additional Hall IC failure occurs in the limp-home mode. In this case, the malfunctioning of the forward-reverse switching may be caused by a reduction in the reliability of the shift position detecting device 60. According to this embodiment, it is determined that the deviation abnormality has occurred in one more Hall IC and the switching to the neutral gear is performed as a fail-safe measure in a case where a shift operation to the shift position Psh corresponding to the shift range in the direction opposite to the current shift range has continued for at least the predetermined period of time Ta with regard to two of the three Hall ICs. In this manner, the malfunctioning of the forward-reverse switching is prevented. Accordingly, the malfunctioning of forward-reverse traveling is avoided even when one Hall IC fails. Accordingly, the limp-home mode is allowed based on the other three Hall ICs.

According to this embodiment described above, the limp-home mode is allowed by the other three Hall ICs even when one of the four Hall ICs fails. An abnormality determination is made with regard to the three Hall ICs as well, based on whether or not the three Hall ICs output a voltage signal to the shift position Psh for traveling in the direction opposite to the traveling direction during the traveling, and thus the malfunctioning of the forward-reverse switching in the limp-home mode by the other three Hall ICs is avoided reliably. Accordingly, the limp-home mode by the three Hall ICs is allowed while the malfunctioning of the forward-reverse switching is avoided reliably. When an abnormality is determined in any one of the three Hall ICs, the shift range of the driving device 40 is switched to the neutral gear, and thus reverse traveling attributable to the malfunctioning of the forward-reverse switching can be avoided reliably.

According to this embodiment, the voltage signals output from the other three Hall ICs showing the same shift position Psh without exception results in a determination of operation to that shift position Psh even in a case where one of the four Hall ICs fails. Accordingly, the limp-home mode based on that shift position Psh is allowed.

According to this embodiment, the four Hall ICs output different voltage values in accordance with the relative position with respect to the magnet 62. Accordingly, the determination of the shift position Psh based on the voltage value output by Hall IC is allowed.

According to this embodiment, the relative relationship between the voltage values output from the respective Hall ICs is reversed when the shift lever 32 is operated in the select direction. Accordingly, a select-direction operation of the shift lever 32 can be determined.

According to this embodiment, an abnormality determination is made based on whether or not the differential value in voltage value output from the four Hall ICs exceeds the pre-set tolerance. In this manner, the differential value in voltage value output from the respective Hall ICs is calculated with frequency while it is determined whether or not the differential value exceeds the tolerance. Accordingly, the Hall IC that has an abnormality can be detected (identified) with frequency.

One embodiment of the invention has been described in detail with reference to accompanying drawings above. However, the invention is also applicable in other aspects.

For example, the shift position detecting device may be configured to have five or more Hall ICs although the shift position detecting device 60 according to the embodiment described above is configured to have the four Hall ICs. In a case where the number of the Hall ICs is five, for example, a limp-home mode based on the other four Hall ICs may be executed when one Hall IC fails. In this case, an abnormality may be determined in a case where, for example, three Hall ICs output a signal (signal voltage) to a shift position that differs from the direction of movement (traveling direction) during the traveling and then a fail-safe measure such as switching to the neutral gear may be executed. In a case where the number of the Hall ICs constituting the shift position detecting device is N, a limp-home mode may be executed based on (N−1) Hall ICs when one Hall IC fails. In this case, an abnormality may be determined in a case where, for example, (N−2) Hall ICs output a signal (signal voltage) to the shift position Psh for traveling in the direction opposite to the direction of movement during the traveling and then a fail-safe measure such as switching to the neutral gear may be executed.

The arrangement of the respective shift positions Psh in the shift operation device according to the embodiment described above is merely an example and can be appropriately modified. Although the shift lever 32 has been described as a momentary-type one, the shift lever 32 does not have to be a momentary-type one.

In the embodiment described above, a case has been described where one Hall IC fails and the deviation abnormality occurs in any one of the other three Hall ICs. In a case where disconnection or a short circuit is detected in any one of the other three Hall ICs, however, a fail-safe measure may be executed at that point in time.

What has been described above is merely an embodiment, and the invention can be modified or improved in various forms based on the knowledge of those skilled in the art.

What is claimed is:

1. A shift position detecting device for a vehicle, the shift position detecting device comprising:
    a shift selector;
    a magnet integrally disposed in the shift selector;
    four or more sensors arranged at positions facing the magnet; and
    an electronic control unit configured to:
        (i) determine a shift position of the shift selector based on signals output from the four or more sensors when the magnet is relatively displaced with respect to the four or more sensors in response to an operation of the shift selector;
        (ii) determine the shift position based on signals output from three or more sensors of the four or more sensors determined to be normal when any one of the four or more sensors is determined to be abnormal; and
        (iii) determine the abnormality with regard to the three or more sensors based on whether or not the three or more sensors individually output, during traveling of the vehicle, a signal to a shift position pertaining to a case of traveling in a direction opposite to a traveling direction of the vehicle.

2. The shift position detecting device according to claim 1,
    wherein the electronic control unit is configured to determine, when the signals output from the three or more sensors are signals corresponding to the same shift position, that the same shift position is the shift position of the shift selector.

3. The shift position detecting device according to claim 1,
    wherein the four or more sensors output voltage signals in accordance with a relative position with respect to the magnet disposed in the shift selector and the voltage signals output by the four or more sensors have different voltage values.

4. The shift position detecting device according to claim 3,
    wherein the four or more sensors are collinearly arranged,
    the shift selector is configured to move in a shift direction and a select direction, the shift direction being a direction of arrangement of the four or more sensors, and the select direction being perpendicular to the shift direction, and
    a relative relationship of the voltage values output from the four or more sensors is reversed when the shift selector is operated in the select direction.

5. The shift position detecting device according to claim 3,
    wherein the electronic control unit is configured to determine the abnormality based on whether or not a differential value between the voltage values output from the four or more sensors exceeds a pre-set tolerance.

6. A shift control device for a vehicle, the vehicle including a driving device, the shift control device comprising:
    a shift selector;
    a magnet integrally disposed in the shift selector;
    four or more sensors arranged at positions facing the magnet; and
    an electronic control unit configured to:
        (i) determine a shift position of the shift selector based on signals output from the four or more sensors when the magnet is relatively displaced with respect to the four or more sensors in response to an operation of the shift selector;
        (ii) determine the shift position based on signals output from three or more sensors of the four or more sensors determined to be normal when any one of the four or more sensors is determined to be abnormal;
        (iii) determine the abnormality with regard to the three or more sensors based on whether or not the three or more sensors individually output, during traveling of the vehicle, a signal to a shift position pertaining to a case of traveling in a direction opposite to a traveling direction of the vehicle; and
        (iv) switch a shift range of the driving device to a neutral gear when an abnormality is determined in any one of the three or more sensors.

* * * * *